J. NEWMANN.
ROLLER BEARING.
APPLICATION FILED JUNE 13, 1910. RENEWED JULY 29, 1911.

1,003,494.

Patented Sept. 19, 1911.

2 SHEETS—SHEET 1.

Witnesses:
Harry H. Hebig

Inventor
John Newmann
By his Attorney

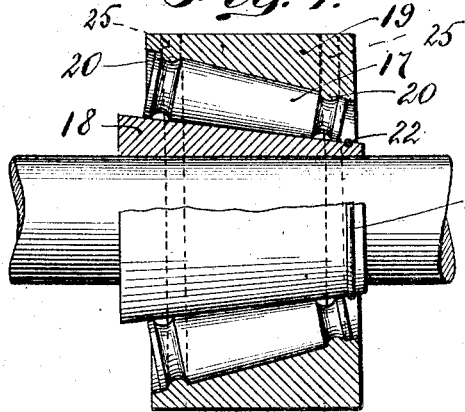
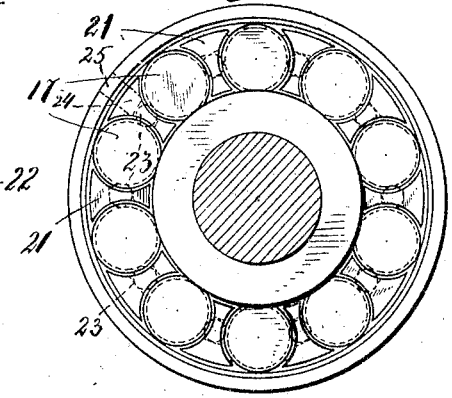
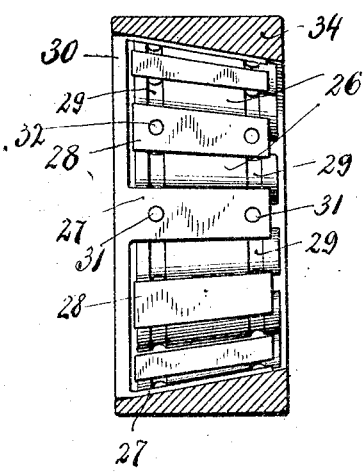
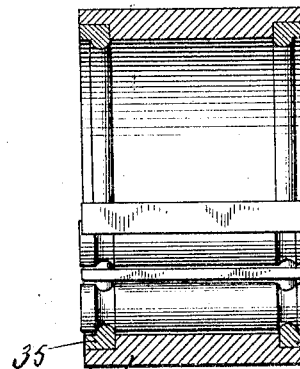
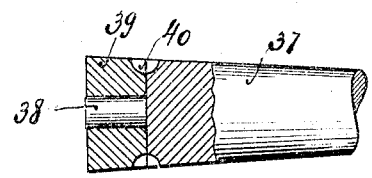

UNITED STATES PATENT OFFICE.

JOHN NEWMANN, OF BROOKLYN, NEW YORK.

ROLLER-BEARING.

1,003,494.     Specification of Letters Patent.     Patented Sept. 19, 1911.

Application filed June 13, 1910, Serial No. 566,476. Renewed July 29, 1911. Serial No. 641,383.

*To all whom it may concern:*

Be it known that I, JOHN NEWMANN, a citizen of the United States of America, residing at Brooklyn, in the county of Kings and State of New York, have invented certain new and useful Improvements in Roller-Bearings, of which the following is a specification.

The object of my invention is to further improve the roller bearing disclosed in my prior application Ser. #515,563, filed September 1, 1909, such, as to dispense partly or wholly with rigid cages, but to construct a roller bearing of individual parts that can be readily mounted and locked together. Such construction will greatly reduce the costs of roller bearings and facilitate the manufacture thereof.

With this object in view, my invention consists in the improvement, construction and combination of parts as will hereinafter be fully specified.

Figure 1:
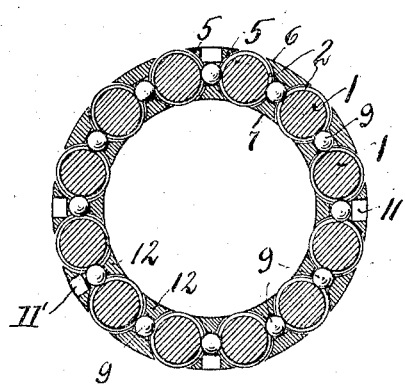
Figure 2:
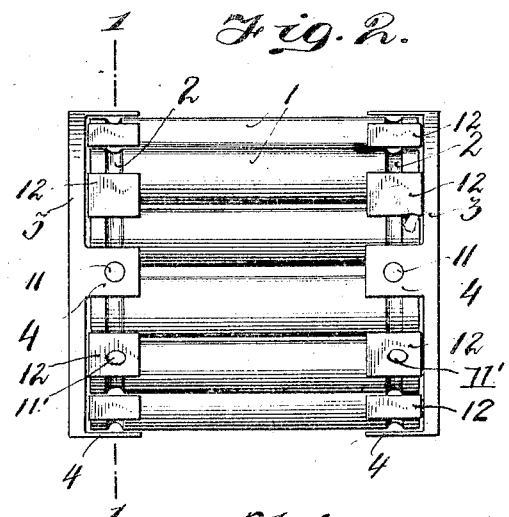
Figure 3:
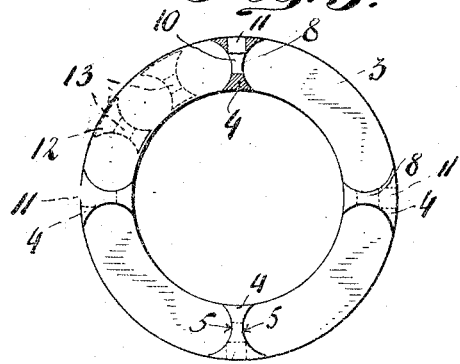
Figure 4:
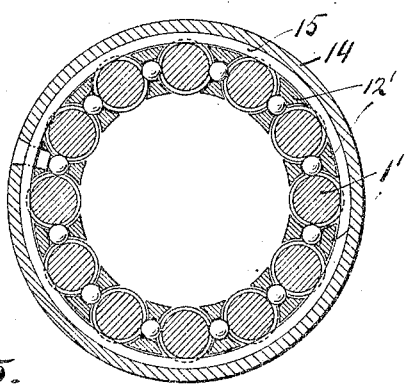
Figure 5:
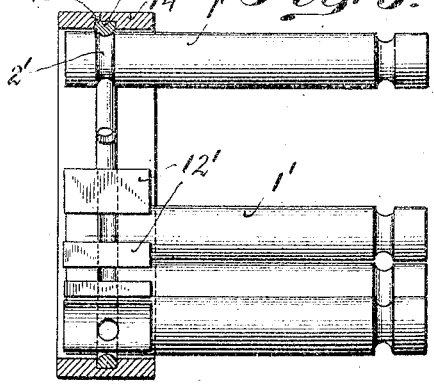
Figure 6:
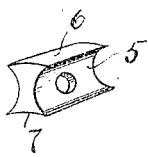

In the accompanying drawings, in which similar reference letters denote corresponding parts, Figure 1 is a cross section on line 1—1 of Fig. 2 of the roller bearing; Fig. 2 is an elevation of the roller bearing; Fig. 3 is an inner view of one of the end cages or casings, from which the rollers are removed; Fig. 4 is a similar cross section as Fig. 1 of a modified construction; Fig. 5 is a vertical section of this modified construction; Fig. 6 is a detail in perspective view; Fig. 7 is a vertical section of a conical roller bearing; Fig. 8 an end view thereof; Fig. 9 a vertical section of another modified construction; Fig. 10 a vertical section of a further modification and Fig. 11 a modified construction of a roller.

With reference to Figs. 1–3, the roller bearings consist of rollers 1, that in the manner disclosed in my prior application are at one or both ends or in the center provided with annular grooves 2 of cylindrical cross section, and of annular end pieces or cages 3. These end pieces have fixed to them or are made integral with three or more projections, blocks or noses 4 axially extending from the sides facing the rollers and arranged at uniform distances from one another, the same having cylindrical and concaved side surfaces 5 and cylindrical upper and lower surfaces 6, 7 (Figs. 1 and 6). The width of the central portion 8 of these noses or blocks 4 is such that a ball 9 of very small diameter placed in a central cross bore 10, of these blocks will protrude at both sides outward (Fig 1). In these rigid blocks or noses 4 there are also radial bores 11 of a width equal to the diameter of the ball 9, through which the latter may be slipped into the central cross bores 10. In addition to these rigid blocks or noses, I employ a number of loose blocks 12 of the same configuration and size as the rigid blocks and which are adapted to be interposed between two successive rollers. These loose blocks, excepting one, which will be mounted last, need not have the radial bores for the introduction of the balls 9, but only central cross bores 13 into which the balls 9 prior to mounting can be slipped in from either side of said loose blocks. The balls 9 resting in the central cross bores 10 of the rigid blocks 4 and in the bores 13 of the loose blocks 12 are adapted when the individual parts are assembled, to engage the annular grooves 2 of the rollers 1 and to thereby bind the parts together.

The mounting or assembling of the parts is accomplished as follows: At first a ball is introduced into the central bore 10 of one of the rigid blocks 4 of each end piece through its radial bore 11. Then a roller is engaged with its ends into the end pieces so that its annular grooves 2 register with and engage the protruding parts of said balls. Then a short loose block with the ball already inserted in its central cross bore is placed around the grooved ends of the rollers, so that said balls will engage the grooves of the rollers. Then a second roller is placed in position engaging with its annular groove the protruding part of the ball of the loose block. Thereupon a second loose block containing a ball is placed in position, and so forth. This mounting piece by piece of rollers and blocks alternately is continued until, but for one loose block, the roller bearing is completed. The last block is then introduced without a ball therein and is locked in position by subsequently slipping a ball through a radial bore 11′ into the central bore 13 thereof. When so locked in position, the roller bearing is prevented from accidentally falling apart and is very effective. The radial bores may be clogged by plugs or the like, to prevent the removal of the locking balls.

In the modification of Figs. 4 and 5, the rigid blocks have been dispensed with entirely. Here the grooved ends of the rollers are mounted in cylindrical end cages 14, which on their inside are provided with an annular collar 15 of semi-circular cross section formed by a split ring fitted in a groove 16. This collar is adapted to embrace the rollers 1' and engage their end grooves 2' from the outside, while the loose blocks 12' are somewhat shorter, i. e. their outer surfaces are flush with the bottom of the annular grooves of the rollers 1'. In other respects the construction of the roller bearing is similar to the one described above.

In the modification of Figs. 7 and 8 conical rollers 17 are shown and here no end cages, but an internal central conical bushing 18 is used on which the conical rollers are adapted to roll. Surrounding the rollers from the outside is a cylindrical casing 19 which at both ends according to the construction of the rollers is provided with annular projections or collars 20 that similarly to the collar 15 are adapted to engage the annular grooves of the rollers. The short loose blocks 21 that are interposed between the rollers are also shorter, i. e. their outer surfaces are flush with the bottom of the annular grooves of the rollers to permit of the engagement of the collars into the grooves of the rollers. The internal bushing may be secured against longitudinal displacement by a wire ring 22 embracing the circumference thereof at the smaller base. This wire ring projects somewhat from the surface of the bushing and will prevent it, when the rollers and loose blocks are assembled, from becoming axially displaced.

The locking of the rollers and loose blocks to one another in alternate manner is accomplished in the same way as in the foregoing modifications, namely by means of small balls 23 placed into central cross bores of the loose blocks. The last mounted block necessitates also a radial bore 24 for the introduction of the ball through a somewhat wider radial bore 25 made in the cylindrical outer casing 19. If the rollers are considerably long, they may have a groove at each end and short loose blocks may be used for each end. The cylindrical casing will then require a radial bore at each end, as in the example shown. This construction, however, can be used also in combination with the end pieces or cages shown in Fig. 1.

The modification of Fig. 9 is similar to the construction shown in Figs. 1–3, with the difference, that here conical rollers 26 are used. The rollers not being as long as in the above named first construction, the rigid and loose blocks 27, 28 are made to extend through about the entire length of the rollers. Furthermore here each roller being provided with a groove 29 at each end, the rigid blocks and one of the loose end blocks requires a radial bore 31, 32 at each end to register with the annular grooves 29 of the rollers. In addition to the conical cage 30 having the rigid blocks 27, I employ a cylindrical casing 34, having a conical cross bore and which is slipped around the assembled rollers from the end of the smaller base thereof. The cylindrical casing may be locked in position by collars similar to those shown in Figs. 4 and 5 or those of Figs. 7 and 8.

In the last modification shown in Fig. 10, the only difference in construction from that of the foregoing modifications consists in the arrangement of collars 35, 35', as separate ring-shaped pieces which after the cylindrical casing 36 is finished are mounted in position. Thereby the work of finishing the casing is greatly facilitated.

The rollers in the various modifications shown may be composed of two or three separate parts, that is, a central part 37 having reduced portions or pins 38 and end pieces 39 adapted to be secured on said pins. The annular grooves 40 are milled in so that a part thereof will be in the central body and the other part in the end piece. The advantage of such construction is that when through continuous use the groove becomes worn out, the end piece can be removed and replaced by another, instead of having to renew the entire roller.

Of course, there may still be other modifications made by those skilled in the art, without deviating from the principle of my invention and I therefore, do not wish to be understood as restricting myself to the constructions shown and described, but

What I claim and desire to secure by Letters Patent is:

1. A roller bearing, comprising annularly grooved rollers, centrally recessed loose blocks interposed between the said rollers and balls contained in the recesses of said loose blocks and extending outward at both sides of the same and engaging the annular grooves of the said rollers.

2. In a roller bearing, the combination with the rollers having annular grooves, of loose blocks having cylindrical and concaved side surfaces and central cross bores, said blocks being interposed between the rollers and balls in said bores projecting outward from said blocks at both sides thereof and engaging the annular grooves of the rollers.

3. In a roller bearing, the combination with the rollers having annular grooves, of loose blocks having cylindrical and concaved side surfaces and central cross bores, one of the loose blocks having a radial bore and a central cross bore, said blocks being interposed between the rollers, and balls in said central bores projecting outward from said blocks at both sides thereof and engaging the annular grooves of the rollers.

4. A roller bearing, comprising rollers having annular grooves, loose blocks having cylindrical and concaved side surfaces and central cross bores, said blocks being interposed between the rollers, balls in the said central bores projecting outward from said blocks at both sides thereof and engaging the annular grooves of the rollers, and means to hold the assembled parts together.

5. In a roller bearing, a cage composed partly of rigid blocks and partly of loose blocks, said blocks having cylindrical and concaved side surfaces and central cross bores, the rigid blocks and one of the loose blocks having also radial bores terminating in the said central bores, and balls fitting in the cross bores.

6. In a roller bearing, the combination with rollers having annular grooves, of blocks having cylindrical and conical side surfaces and central cross bores, balls fitting in said bores, and annular end pieces embracing the grooved ends of said rollers and having ribs on their inner circumference, said ribs engaging said annular grooves of the rollers.

7. In a roller bearing, the combination with conical rollers having annular grooves, of blocks between said rollers having conical and concaved side surfaces and central bores, an internal conical bushing on which the rollers roll, an external casing having radial bores and embracing the rollers, collars formed on the inner surface of said casing, a loose block having central and radial bores registering with the bores of the external casing, and balls in said loose blocks engaging the annular grooves of the rollers.

8. In a roller bearing, a roller having reduced lateral extensions and end pieces removably borne on said extensions, said end pieces and the roller having marginal, annular, curved grooves which when the end pieces are mounted on the said lateral extensions of the rollers each form with the opposite groove in the roller a single annular groove of cylindrical cross section.

In testimony whereof I affix my signature in presence of two witnesses.

JOHN NEWMANN.

Witnesses:
 MAX D. ORDMANN,
 JOHN T. CARMODY.